Aug. 30, 1938.   J. E. ANDREAU   2,128,687
STREAMLINED VEHICLE
Filed Oct. 10, 1936   3 Sheets-Sheet 2
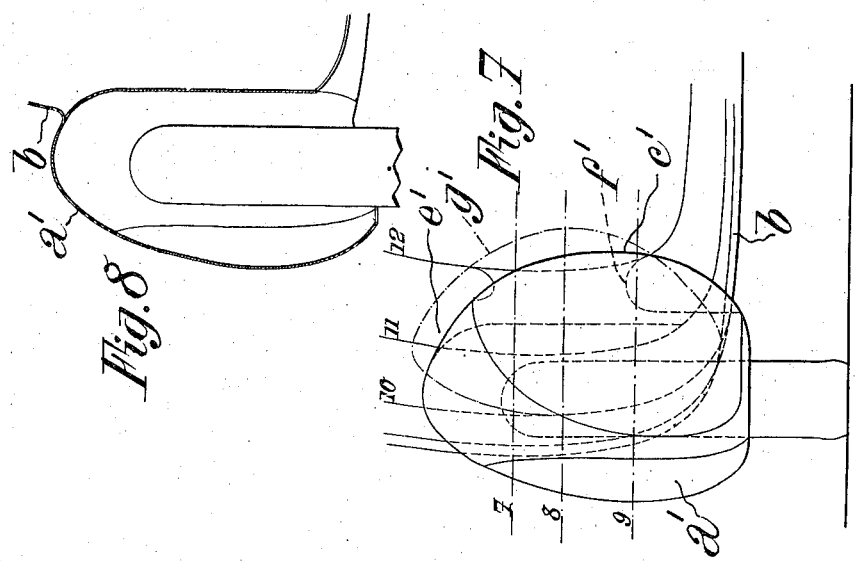
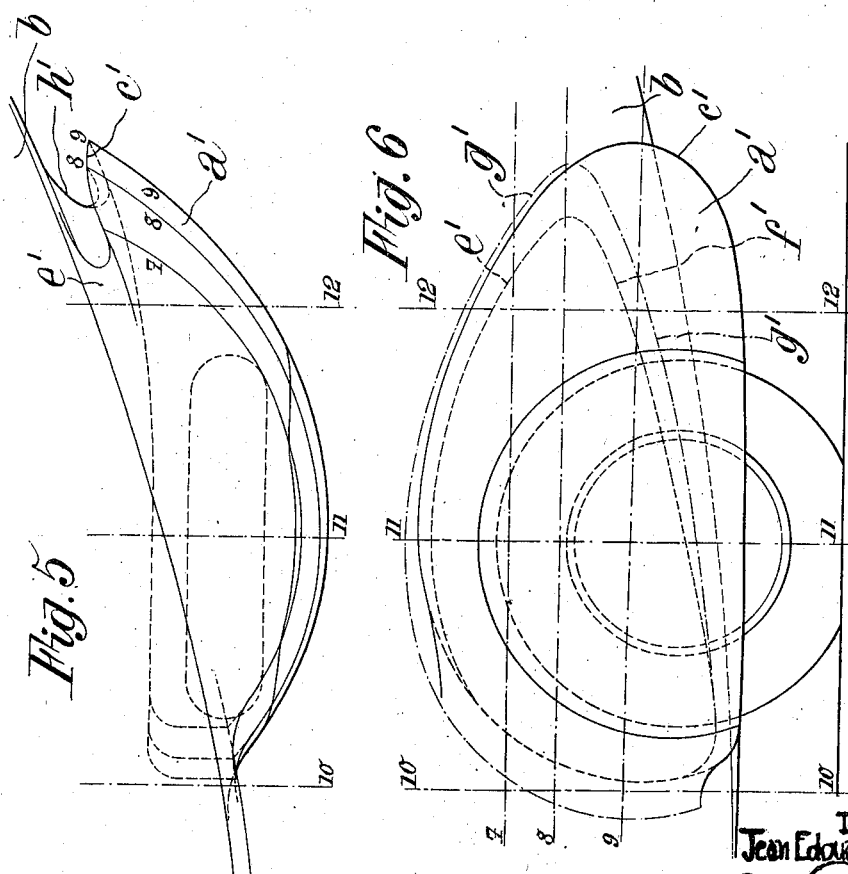
Inventor:
Jean Edouard Andreau
Bailey & Larson
Attorneys Aug. 30, 1938.  J. E. ANDREAU  2,128,687
STREAMLINED VEHICLE
Filed Oct. 10, 1936   3 Sheets-Sheet 3
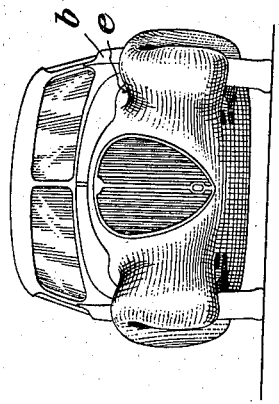
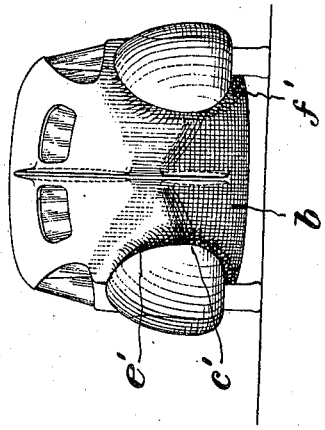
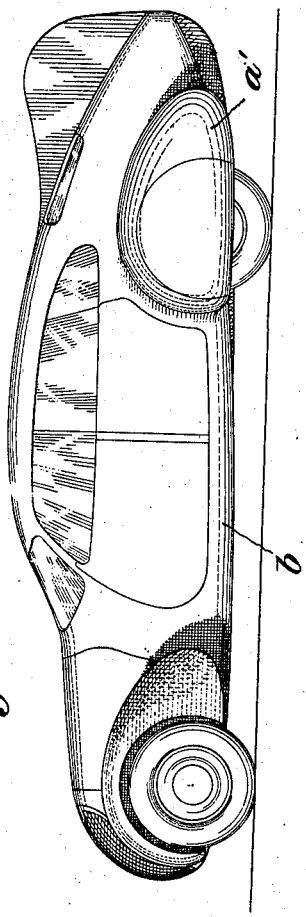
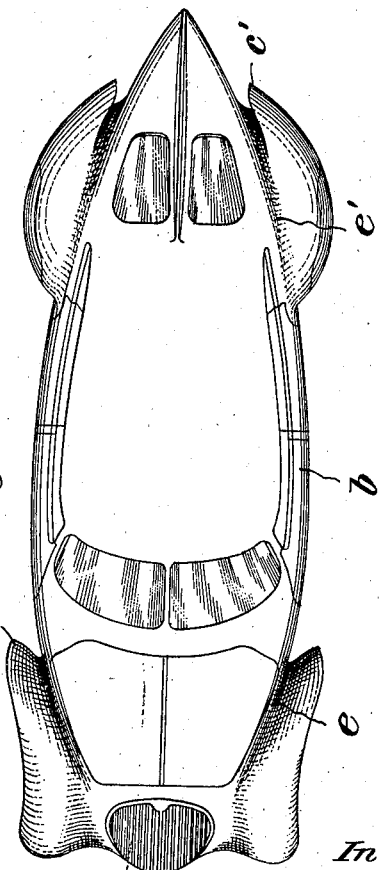
Inventor:
Jean Edouard Andreau,
Attorneys Patented Aug. 30, 1938

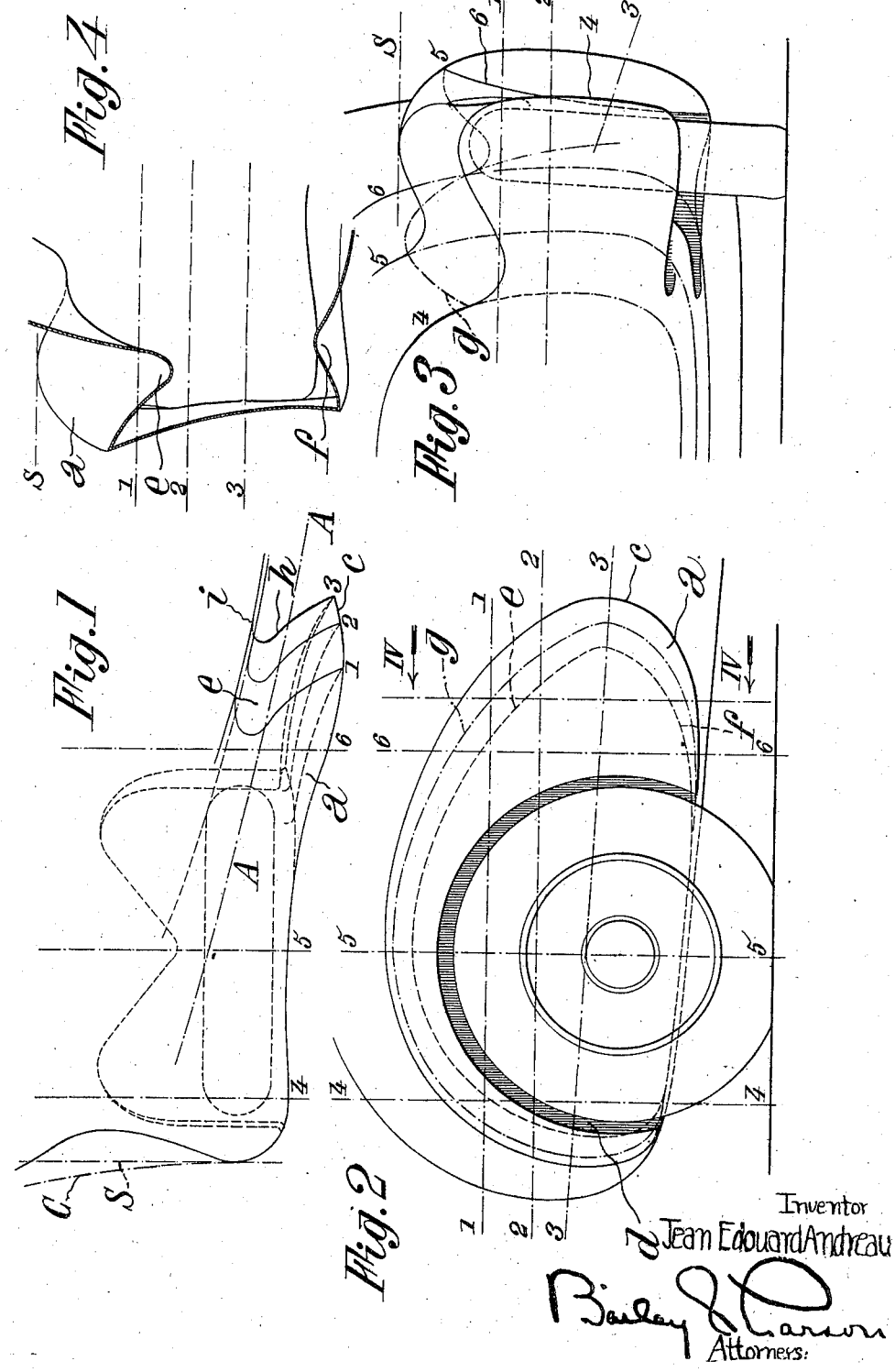

2,128,687

UNITED STATES PATENT OFFICE 2,128,687

STREAMLINED VEHICLE

Jean Edouard Andreau, Paris, France

Application October 10, 1936, Serial No. 105,136
In Belgium October 17, 1935

7 Claims. (Cl. 280—152)

This invention relates to streamlined vehicles including wheels which are disposed laterally with respect to a main streamlined body or casing; and more particularly, though not exclusively, to automobile vehicles.

When the wheels of the vehicles in question are located at a relatively large distance from the body or casing, for example in the case of vehicles of large span or with small-sized bodies, such as racing vehicles, it has already been proposed to dispose, around the wheels fairings in the shape of thick wing elements in vertical section, arranged at zero lift angle with respect to the relative wind with a view to offering a minimum axial resistance. The elements connecting the wheel to the body of the vehicle are then mounted in a connecting fairing.

When, on the contrary, the body of the vehicle is so dimensioned that the wheels are very close to the body, for example are partly encased therein, it has been suggested to streamline the wheels by means of covering adapted to join in a continuous manner with the main streamlined casing.

The invention applies more particularly to the cases to which the above two solutions are inapplicable that is to say when the wheels are partly engaged in the body or a fairing close to the outer surface of the latter.

In this instance it is impossible to apply the first solution because the streamlined connecting fairings would have to be of too large a size and their joining to the wheel fairings would wholly destroy the symmetry of flow necessary in order to obtain appropriate results. This results from the fact that it is impossible to give the wheel fairings or wings either the volume, or the length, or again the curvature, required for obtaining the zero lift angle. Besides, even supposing that it were possible to attain this result, this expression would no longer have any significance because the intersection of the wheel fairing with the connecting fairing stops the flow of air on the side of the body.

The second solution is also often inapplicable in the case that is considered since a normal covering would project to too large a degree.

Such difficulties arise particularly when it is desired to surround each of the front guiding wheels of a vehicle of usual construction, with a fixed fairing enclosing, at least partly, the wheel in the various positions it assumes in the course of steering. The same applies where the rear wheels engage at the front into a body streamlined casing wall having a considerable obliquity with respect to the planes of the wheels.

The object of the present invention is to provide a wheel fairing which avoids these drawbacks.

An essential feature of the present invention consists in providing around the wheels of vehicles of the kind in question a housing directly joined to the body of the vehicle and having a rear edge standing out from said body and inclined with respect to the direction of the axial vertical plane of the vehicle, in the direction of inclination of the air streams immediately at this rear edge.

Other features of the present invention will appear from the following detailed description of some specific embodiments thereof.

Preferred embodiments of the present invention will be hereinafter described, with reference to the accompanying drawings, given merely by way of example, and in which:

Figures 1, 2 and 3 of these drawings illustrate, in plan, elevational and front view respectively, the stream-lined fairing of a front guiding wheel of a vehicle designed in accordance with the present invention.

Figure 4 is a section on the line IV—IV of Fig. 2.

Figures 5, 6 and 7 illustrate in a similar manner to Figs. 1, 2 and 3 (Fig. 7 being however a view from the rear), the streamlined fairing of a rear wheel of a vehicle constructed in accordance with the invention.

Figure 8 is a section on II—II of Fig. 6.

Fig. 9 is a side elevation of a vehicle embodying my invention.

Fig. 10 is a front view of the same.

Fig. 11 is a top plan view, and

Fig. 12 is a rear view.

The invention will be hereafter described as applied to a four-wheeled automobile vehicle having a streamlined body into which the wheels are to be partly engaged.

I provide, for enveloping each of the wheels, a fairing joined directly to the body envelope and having a rear edge $c$ or $c'$ standing out from said casing and deviated, with respect to the direction of the vertical axial plane of the vehicle, in the direction of the inclination of the air streams flowing past this rear edge.

Now, considering first the case of front wheels, it will be assumed that the housing thereof is not to be designed to enclose the wheel when it is turned outwardly. Therefore a hollowed portion $d$ will be provided in the lateral wall of this housing, such as that to be formed in the usual wings of automobiles. As a matter of fact this hollowed part may be adapted for complete obturation, when the vehicle is running along a straight line, by a pivotal closure plate, as has often been proposed.

This housing is given, directly above the wheel, a shape such that it permits the full vertical displacement of the wheel, which determines the position of the upper wall of the housing.

In elevation, this housing is given a spatulate form such as illustrated in Fig. 2.

This housing is joined to the main body or casing $b$ in the following manner:

One will first consider a cylindrical surface $s$ having its generatrices perpendicular to the vertical plane of symmetry of the vehicle and having as directrix the outline, in elevation, of the housing. This surface will subsequently be recessed along the sides of the body so as to form, toward the rear portion of the housing, an upper groove or throat $e$ and a lower groove or throat $f$, said grooves having transverse curvilinear sections joined laterally tangentially with the casing (along a line $g$) and with the adjacent walls of the housing.

Thus transverse sections of the housing on the lines 4—4; 5—5; 6—6; and IV—IV, Figs. 1 and 2 advantageously have the cruciform appearance shown by Figs. 3 and 4.

Grooves or throats $e$ and $f$ are joined together at the rear along a concave curve $h$ (shown in plan in Fig. 1), the curve of this portion $h$ preferably being itself tangential to the main body at $i$ and having its extremity opposite to the casing or body located on the rear edge $c$ above referred to.

Grooves $e$ and $f$ may be extended forwardly to the fullest extent allowed by the shape of the fairing casing. They will not of course reach as far as the place where the theoretical transverse contour will be sunken into the body. They may likewise terminate forwardly in front of the place where the housing merges with the body or casing along a curve such as that represented in dot-and-dash lines at C, Fig. 1, that is to say, a curve which, when seen in elevation, is not re-entrant.

Advantageously said grooves $e$ and $f$ get progressively deeper and deeper toward the rear, especially in the case where they start from the point where the transverse contour of the housing is directly joined to the main streamlined body or casing.

Preferably all the transitions or fillets will be so made that the sections of the housing taken along surfaces having the same curvature as the air streams flowing around the casing (such as surface A—A, Fig. 1) have good penetration forms, preferably with continuously varying curvature so as to eliminate or reduce eddies.

Finally the housing is completed by a lateral surface joined to the walls already defined.

This junction may be effected in a continuous manner, for instance as shown in front by Fig. 1, or by sections on lines 4—4 and 5—5, and this will be more particularly the case at the front and the upper portion of said lateral surface.

On the other hand, at other points, and especially rearwardly, this junction may occur along a sharp ridge as indicated by the sections on lines 1—1, 2—2, 3—3, 4—4 and IV—IV, the sharp edge thus determined being, so to speak, a continuation of the rear edge $c$. It will be understood, however, that all the junctions might have a continuous form, even in the region of the rear edge $c$, which in this case would assume a blunt-edge form.

The lateral surface referred to may be given any desired shape and in particular may have, at the rear, a concavity such as is illustrated in Figs. 1 and 4, being moreover spaced from the plane of symmetry of the vehicle to a greater extent at its upper portion than at its lower portion.

The various elements of the housing and especially the sections thereof such as those along surface A—A (Fig. 1) will be so designed that the air streams leaving recessed parts $e$ and $f$ will have, in the vertical plane of rear edges $c$, substantially the same relative velocity at their meeting point, and that this velocity is substantially the same as that of the air streams proceeding from the external face of the housing. The resultant direction of flow must be that of the general line of flow around the streamlined body, which may be checked, in particular in the wind tunnel.

This will, in certain cases, involve giving the housing a form such that grooves $e$ and $f$ exist only near the rear, while, at the front, use is made of a joining surface such that no recess is apparent in transverse projection (contour C Fig. 1), in spite of the fact that the wheel projects appreciably from the body or casing. The front portion of such a housing is then comparable to that of the housings already known in connection with wheels situated in very close proximity to the body or casing.

However, in all cases, at the rear, instead of joining the housing directly to the streamlined casing, which considerably checks the air flow along the lateral wall of the housing, the projecting edge $c$ is spaced apart from the streamlined body and provides a perfect guiding for the air streams flowing along the lateral wall of the housing.

Now as regards housings for rear wheels, these are constructed in exactly the same manner as those for the front wheels, but, of course, as the lines of flow of air around the rear wheels converge toward the rear it will be necessary to deviate the rear edge $c$ inwardly (Fig. 5). Corresponding parts in Figs. 5 to 8 have been given corresponding reference letters to the parts of Figs. 1 to 4 with prime indications.

Sections 7—7, 8—8, 9—9, 10—10, 11—11, and 12—12 in Figs. 5 to 8 indicate the forms which the various walls of the housing can assume.

Here again grooves $e'$ and $f'$ may be provided above and below the rear portion of the housing, these grooves being joined together at the rear along an edge $h'$, so located that the three air streams, flowing rearwardly through grooves $e'$ and $f'$ and along the external face of the housing (which in this case can easily be closed since the wheels are not guiding wheels) respectively, have the same relative velocity, in projection on the lines of flow, at the meeting place.

It should be pointed out that in this case, since the cavity which has to be provided in the base of the housing to allow the passage of the wheel is of smaller size because of the fact that the wheel does not pivot, the lower groove $f'$ may be extended to the front of the housing as shown by Figs. 5 and 7.

On the contrary, at the front the external wall of the housing will be joined directly to the stream-lined casing along a curve which is as progressive as possible, such as that shown at the front in Fig. 5. Besides the external wall may, as a rule, be given a bulging shape over its whole surface.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In connection with a vehicle including a streamlined body and wheels, a fairing for each of these wheels which has a rear edge standing out from said body and, at least in the rear part thereof, concave curved walls joining the top and bottom of said fairing proper with said body so as to form grooves between the fairing proper and said body, one of said grooves opening upwardly and the other downwardly, the bottom of said first groove extending gradually and continuously in downward direction and the bottom of said second groove extending gradually and continuously in upward direction.

2. In connection with a vehicle including a streamlined body and wheels, a fairing for each of these wheels fixed to said body, said fairing being directly connected to said body at the front and having at the rear a substantially vertical rear edge standing out from said body, and, at least at the rear part thereof, concave curved walls joining the top and bottom of said fairing proper with said body, so as to form grooves between the fairing proper and said body, one of said grooves opening upwardly and the other downwardly, the bottom of said first groove extending gradually and continuously in downward direction and the bottom of said second groove extending gradually and continuously in upward direction.

3. In connection with a vehicle including a streamlined body and wheels, a fairing for each of these wheels fixed to said body, said fairing being directly connected to said body at the front and having at the rear a substantially vertical rear edge standing out from said body, and at least at the rear part thereof, concave curved walls joining the top and bottom of said fairing proper to said body tangentially thereto, so as to form grooves between the fairing proper and said body, one of said grooves opening upwardly and the other downwardly, the bottom of said first groove extending gradually and continuously in downward direction and the bottom of said second groove extending gradually and continuously in upward direction, the respective elements of the fairing being shaped in such manner that the air streams leaving said concave curved walls or grooves have respective velocities equal to each other and to that of the air streams leaving the rear end of the outer lateral surface of the fairing proper, the direction of the resultant air stream coinciding with the general line of flow of air around the streamlined body of the vehicle.

4. In connection with a vehicle including a streamlined body and wheels, a fairing for each of these wheels fixed to said body, said fairing being directly connected to said body at the front and having at the rear a substantially vertical rear edge standing out from said body, and at least at the rear part thereof, concave curved walls joining the top and bottom of said fairing proper to said body tangentially thereto so as to form grooves between the fairing proper and said body, one of said grooves opening upwardly and the other downwardly, the bottom of said first groove extending gradually and continuously in downward direction and the bottom of said second groove extending gradually and continuously in upward direction, said concave curved walls being joined to each other, at the rear, along a concave curve, one end of which merges tangentially into the vehicle body, while the other end is located on said rear edge of the fairing proper.

5. In connection with a vehicle including a streamlined body and wheels, a fairing for each of these wheels fixed to said body, said fairing being directly connected to said body at the front and having at the rear a substantially vertical rear edge standing out from said body, and at least at the rear part thereof, concave curved walls joining the top and bottom of said fairing proper to said body tangentially thereto so as to form grooves between the fairing proper and said body, one of said grooves opening upwardly and the other downwardly, the bottom of said first groove extending gradually and continuously in downward direction and the bottom of said second groove extending gradually and continuously in upward direction, the depth of said grooves increasing gradually from the front toward the rear.

6. In connection with a vehicle including a streamlined body and front wheels, a fairing for each of these wheels which has a rear edge standing out from said body and deviating outwardly with respect to the direction of the vertical axial plane of the vehicle and, at least in the rear part of said fairing, concave curved walls joining the top and bottom of said fairing proper with said body so as to form grooves between the fairing proper and said body, one of said grooves opening upwardly and the other downwardly.

7. In connection with a vehicle including a streamlined body and rear wheels, a fairing for each of these wheels which has a rear edge standing out from said body and deviating inwardly with respect to the direction of the vertical axial plane of the vehicle and, at least in the rear part of said fairing, concave curved walls joining the top and bottom of said fairing proper with said body so as to form grooves between the fairing proper and said body, one of said grooves opening upwardly and the other downwardly.

JEAN EDOUARD ANDREAU.